United States Patent
Yamahara et al.

(10) Patent No.: US 7,246,694 B2
(45) Date of Patent: Jul. 24, 2007

(54) FRICTION ROLLER IN CONVEYOR

(75) Inventors: Yasushi Yamahara, Toyota (JP); Masanori Motoda, Toyota (JP); Masashi Kimura, Toyota (JP); Masaharu Sugiura, Toyota (JP); Akira Ishii, Toyota (JP); Toshitaka Aoki, Aichi-ken (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/559,822

(22) PCT Filed: Jul. 16, 2004

(86) PCT No.: PCT/IB2004/002308

§ 371 (c)(1),
(2), (4) Date: Dec. 8, 2005

(87) PCT Pub. No.: WO2005/007543

PCT Pub. Date: Jan. 27, 2005

(65) Prior Publication Data

US 2006/0151080 A1   Jul. 13, 2006

(30) Foreign Application Priority Data

Jul. 18, 2003   (JP) .............................. 2003-276972

(51) Int. Cl.
*B65G 39/02*   (2006.01)
(52) U.S. Cl. ........................ 193/35 R; 193/37; 198/780
(58) Field of Classification Search .............. 193/35 R, 193/37; 198/780, 785
See application file for complete search history.

(56) References Cited

U.S. PATENT DOCUMENTS

| 3,651,911 | A |   | 3/1972  | Komylak |
|---|---|---|---|---|
| 4,203,509 | A | * | 5/1980  | Thompson et al. ........... 193/37 |
| 4,239,101 | A | * | 12/1980 | Krohmann et al. ........... 193/37 |
| 4,549,592 | A | * | 10/1985 | Schroder .................... 152/328 |
| 4,969,548 | A | * | 11/1990 | Kornylak .................. 193/35 R |

(Continued)

FOREIGN PATENT DOCUMENTS

EP         1 155 980 A1    11/2001

(Continued)

*Primary Examiner*—Douglas Hess
(74) *Attorney, Agent, or Firm*—Finnegan, Henderson, Farabow, Garrett & Dunner L.L.P.

(57) ABSTRACT

A friction roller (10) includes a support roller (11) and an annular elastic ring (15) which it externally fitted to the support roller (11). The support roller (11) is divided into two portions in a thickness direction, that is, a first divided roller (12) and a second divided roller (13). A flange (127) is formed on one side of the first divided roller (12), and a taper face (128) is formed in an outer peripheral face of the first divided roller (12). A knurling portion (129) is formed in the taper face (128). A flange (136) is formed on one side of the second divided roller (13), and a taper face (137) is formed in an outer peripheral face of the second divided roller (13). A knurling portion (138) is formed in the taper face (137). Meanwhile, taper faces (151, 152) expanding outward are formed in an inner peripheral face of the elastic ring (15). The taper faces (151, 152) of the elastic ring (15) are engaged with the taper face (128) of the first divided roller (12) and the taper face (137) of the second divided roller (13).

3 Claims, 14 Drawing Sheets

U.S. PATENT DOCUMENTS 5,454,460 A * 10/1995 Lane .......................... 193/37
6,540,068 B1 * 4/2003 Wesson et al. .............. 198/843

FOREIGN PATENT DOCUMENTS

| | | |
|---|---|---|
| FR | 2 760 732 | 3/1997 |
| JP | 6-83622 | 11/1994 |
| JP | 8-207843 | 8/1996 |
| JP | 2000-351438 A | 12/2000 |
| JP | 2001-206528 | 7/2001 |

* cited by examiner

FRICTION ROLLER IN CONVEYOR

BACKGROUND OF THE INVENTION

1. Field of the Invention

The invention relates to a friction roller in a conveyor. More particularly, the invention relates to a friction roller in a conveyor which conveys an object in an assembly line.

2. Description of the Related Art

Japanese Patent Laid-Open Publication No. JP-A-8-207843 discloses an example of a conveyor which conveys an upper automobile body to a welding process in an automobile body assembly line. In this case, a conveyor 31 includes a long frame 32, and multiple friction rollers 33 fitted to a lateral portion of the frame 32 in a longitudinal direction, as shown in FIG. 13. Each of the friction rollers 33 is driven to rotate when a rotation shaft 35 is rotated by a gear mechanism 36 connected to a drive shaft of a motor 34. A jig pallet 37 on which an upper automobile body B is placed is conveyed on the friction rollers 33. According to the Japanese Patent Laid-Open Publication No. JP-A-8-207843, the assembly line is configured such that welding is performed by a welding machine when the automobile body B is conveyed on the conveyor 31 (refer to FIG. 1 and FIG. 2).

The inner peripheral face of the friction roller 33 is rotated when the rotation shaft 35 is rotated by the motor 34, whereby the jig pallet 37 is conveyed.

Also, in another conveyor line, a jig pallet 2 on which an upper automobile body B is placed includes one long rail 3, as shown in FIG. 1. When a friction roller 40 which is in contact with a lateral face portion of the rail 3 is rotated, the rail 3 itself is moved along a proceeding direction, and the automobile body B placed on the rail 3 can be conveyed.

As shown in FIG. 14, in the friction roller 40, an elastic ring 42 is integrally joined, using an adhesive or the like, to an outer peripheral face of a support roller 41 which has a drive shaft fitting hole 41a. When the elastic ring 42 which is in contact with the rail 3 is driven to rotate by the motor, the rail is conveyed through friction.

In addition, other examples of a conventional conveyance roller used in a conveyor or the like are disclosed in Japanese Patent Laid-Open Publication No. JP-A-2001-206528 (refer to FIG. 1), Japanese Utility Model Laid-Open Publication No. JP-A-6-83622 (refer to FIG. 1), Japanese Patent Laid-Open Publication No. JP-A-2000-351438 (refer to FIG. 1), and the like.

However, in the friction roller 40 shown in FIG. 14, the elastic ring 42 is made of urethane rubber. Since the rail 3 of the heavy jig pallet 2 is conveyed by frictional force of the elastic ring 42 which is rotated, the elastic ring 42 itself greatly wears out, and accordingly the friction roller 40 is frequently replaced with a new one.

Since the elastic ring 42 is integrated with the support roller 41 using an adhesive or the like, it is not possible to easily replace only the worn out elastic ring 42 with a new one when replacing the friction roller 40 with a new one. Therefore, the elastic ring 42 is discarded together with the support roller 41. Alternatively, the elastic ring 42 is peeled from the support roller 41 and a new elastic ring 42 is rejoined to the support roller 41 using an adhesive in order to suppress an increase in cost. As a result, cost increases or workability decreases.

The conveyance roller disclosed in the Japanese Patent Laid-Open Publication No. JP-A-2001-206528 is formed by externally fitting an external cylinder to a roller main body. The external cylinder is formed by joining an elastic plate to a cylindrical body using an adhesive. Therefore, when the elastic plate wears out, the external cylinder itself including the cylindrical body is replaced with a new one. In other words, as described above, since peeling the joined elastic plate from the cylindrical body results in a decrease in workability, the external cylinder itself needs to be replaced with a new one, which increases the cost. Also, when the external cylinder is externally fitted to the roller main body, the external cylinder needs to be prevented from dropping off the roller main body using an engagement ring, which results in an increase in cost and a decrease in workability.

A roller disclosed in the Japanese Utility Model Laid-Open Publication No. JP-A-6-83622 is suitably used as a roller for a conveyor for conveying powders or grains which apply a small load. In this case, an elastic ring is directly fitted to a roller or a pulley which is rotated without using the support roller 41, unlike the friction roller 40 shown in FIG. 14. Therefore, the load that the elastic ring receives is small. Accordingly, it is not suitable to use the roller as the friction roller for a conveyor for conveying, for example, an automobile body which applies a large load, since the roller would greatly wear out due to the large load.

In the case of a roller disclosed in the Japanese Patent Laid-Open Publication No. JP-A-2000-351438, an elastic member is fixed to a metallic fitting member by insert molding. Therefore, when the elastic member wears out, the elastic member needs to be discarded together with the metallic fitting member, which results in an increase in cost.

DISCLOSURE OF THE INVENTION

It is an object of the invention to provide a friction roller in a conveyor, which makes it possible to replace only a worn out elastic ring with a new one so as to suppress an increase in cost.

A first aspect of the invention relates to a friction roller which is fitted to a conveyor in an assembly line, and which conveys a jig pallet. The friction roller includes an annular elastic ring which can come into contact with the jig pallet; and a support roller which is internally fitted to the elastic ring, and which is connected to a drive source. The elastic ring includes positioning means for positioning the support roller. The support roller is formed so as to be divided into two divided portions in a thickness direction. Each of the two divided portions is internally fitted to the elastic ring, and then the two divided portions are combined such that the elastic ring and the support roller are integrated.

According to the first aspect of the invention, in the friction roller, the support roller is formed so as to be divided into two divided portions in the thickness direction, and to be fitted to the elastic ring. That is, the two divided portions of the support roller are inserted into the elastic ring from both sides and are positioned, and then are combined, whereby the friction roller can be assembled. Accordingly, the elastic ring, which wears out when the jig pallet is conveyed in the conveyor, can be removed from the support roller, and replaced with a new one easily. Since only the worn out elastic ring is discarded and a new elastic ring is fitted to the support roller, the support member in the friction roller can be reused, which reduces the cost.

In the friction roller according to the first aspect of the invention, the positioning means of the elastic ring may include symmetrical taper faces which expand outward to both lateral faces, and which are formed in an inner peripheral face of the elastic ring.

With this arrangement, since the symmetrical taper faces expanding outward are formed in the inner peripheral face of the elastic ring, one of the two divided portions of the support roller is inserted from one side such that a taper face formed in an outer peripheral face of the one divided portion is engaged with the taper face of the elastic ring, whereby the divided portion is positioned with respect to the elastic ring, and is internally fitted to the elastic ring. Then, the other divided portion is inserted from the side opposite to the one divided portion, and is internally fitted to the elastic ring and positioned such that a taper face formed in an outer peripheral face of the other divided portion is engaged with the taper face of the elastic ring. Thus, the friction roller can be assembled, and the divided portions can be removed easily. Also, since each of the divided portions can be positioned by engaging the taper face thereof with the taper face of the elastic ring, the friction roller can be assembled also in the thickness direction with high accuracy.

Further, the outer peripheral face of each of the divided portions of the support roller may be formed to have a taper face so that the outer peripheral face can be positioned with respect to the elastic ring, and a taper angle of the taper face of each of the divided portions may be smaller than that of each of the taper faces formed in the inner peripheral face of the elastic ring.

With this arrangement, since the inclination angle of the taper face formed in the outer peripheral face of each of the divided portions is smaller than that of each of the taper faces formed in the inner peripheral face of the elastic ring, the divided portions can be fitted to the elastic body and can be removed from the elastic body easily. Also, when both the divided portions are fitted to the elastic ring, the elastic ring is compressed in the thickness direction, whereby each of the taper faces formed in the inner peripheral face of the elastic ring can be pressed against, and engaged with the taper face formed in the outer peripheral face of each of the both divided portions. Also, the elastic ring can be tightly clamped by the two divided portions of the support roller.

A knurling portion is formed in the taper face of each of the divided portions of the support roller.

With this arrangement, since the knurling portion is formed in the taper face of each of the two divided portions, the divided portions of the support roller and the elastic ring come into contact with each other via the knurling portion, which increases the frictional resistance. Therefore, slipping is unlikely to occur, and efficiency of transmitting the rotation from the support roller to the elastic ring can be improved.

Also, in the first aspect of the invention, a concave groove or a protrusion ring may be formed continuously or intermittently in an entire circumference of one lateral face of the elastic ring.

In the case where the friction roller is fitted to the conveyor and is used for a long time, when a wear amount of the elastic ring reaches a predetermined amount, the elastic ring is replaced with a new one. With the aforementioned arrangement, a reference for determining a time at which the elastic ring needs to be replaced with a new one is indicated by the concave groove or the protrusion ring formed in the one lateral face of the elastic ring, as a slip sign. Therefore, the time at which the elastic ring needs to be replaced with a new one can be visibly determined easily. Thus, the elastic ring can be replaced with a new one at an appropriate time.

BRIEF DESCRIPTION OF THE DRAWINGS

Each of FIG. 10A

Each of FIG. 12A

DETAILED DESCRIPTION OF THE PREFERRED EMBODIMENTS

Hereinafter, an embodiment of the invention will be described with reference to the accompanying drawings.

Figure 1:
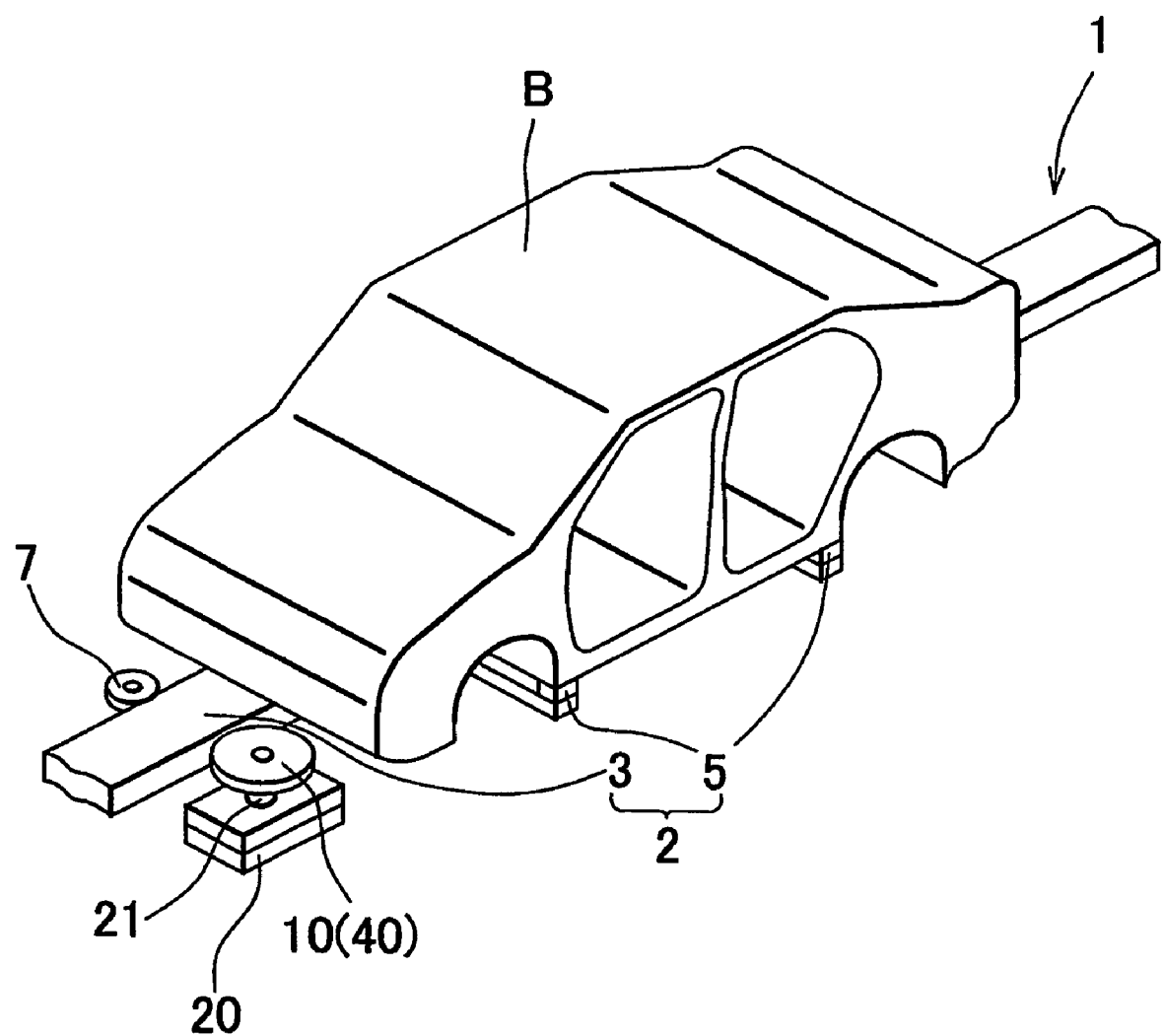
FIG. 1 is a schematic perspective view showing a conveyor which conveys an automobile body.
Figure 2:
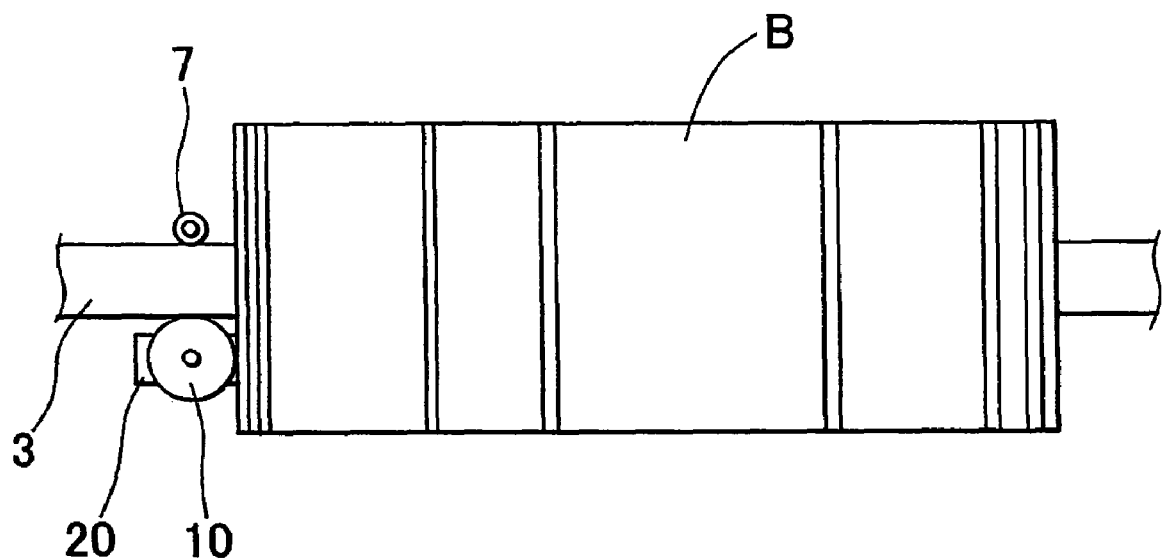
FIG. 2 is a plan view showing the conveyor shown in FIG. 1.
Figure 3:
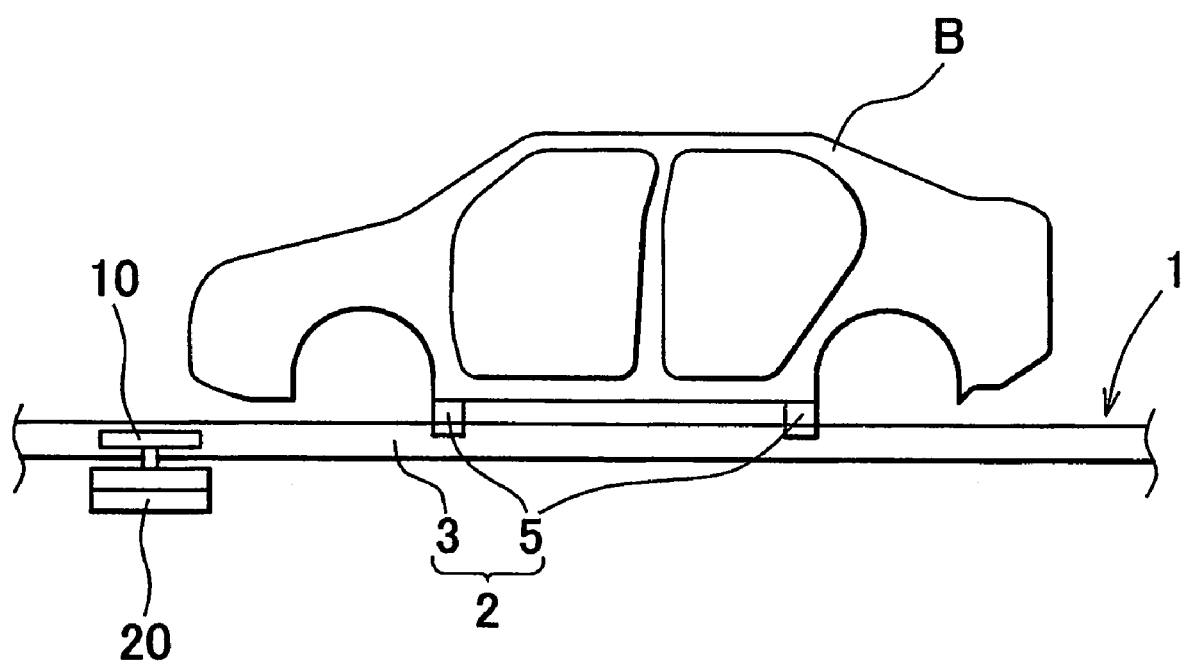
FIG. 3 is a lateral view showing the conveyor shown in FIG. 1.

A friction roller according to the embodiment of the invention is suitably used in a part of a conveyor which conveys an upper automobile body to a welding process in an automobile body assembly line. As shown in FIG. 1 to FIG. 3, a jig pallet 2 on which an automobile body B is placed in a conveyor 1 includes a rail 3 which is formed to be long, and a pair of horizontal members 5 which is fitted on the rail 3, and which is arranged in parallel in a direction orthogonal to a longitudinal direction of the rail 3. The automobile body B is placed on the pair of horizontal members 5. The rail 3 has a cross section having a rectangular shape. The rail 3 can be moved in the longitudinal direction of the rail 3.

A pair of frames (not shown) is disposed with the rail 3 being therebetween. A friction roller 10 which can be pressed against a lateral face of the rail 3 is fitted to one of the pair of frames. A guide roller 7 which is in contact with the lateral face of the rail 3 is fitted to the other frame so as to be opposed to the friction roller 10.

A motor 20 is connected to the friction roller 10 via a drive shaft 21. The motor 20 drives the friction roller 10 such that the friction roller 10 can rotate with respect to a shaft center. The guide roller 7 can rotate with respect to the shaft center. The rail 3 is engaged with the friction roller 10 and the guide roller 7 so as to be slidable.

Figure 4:
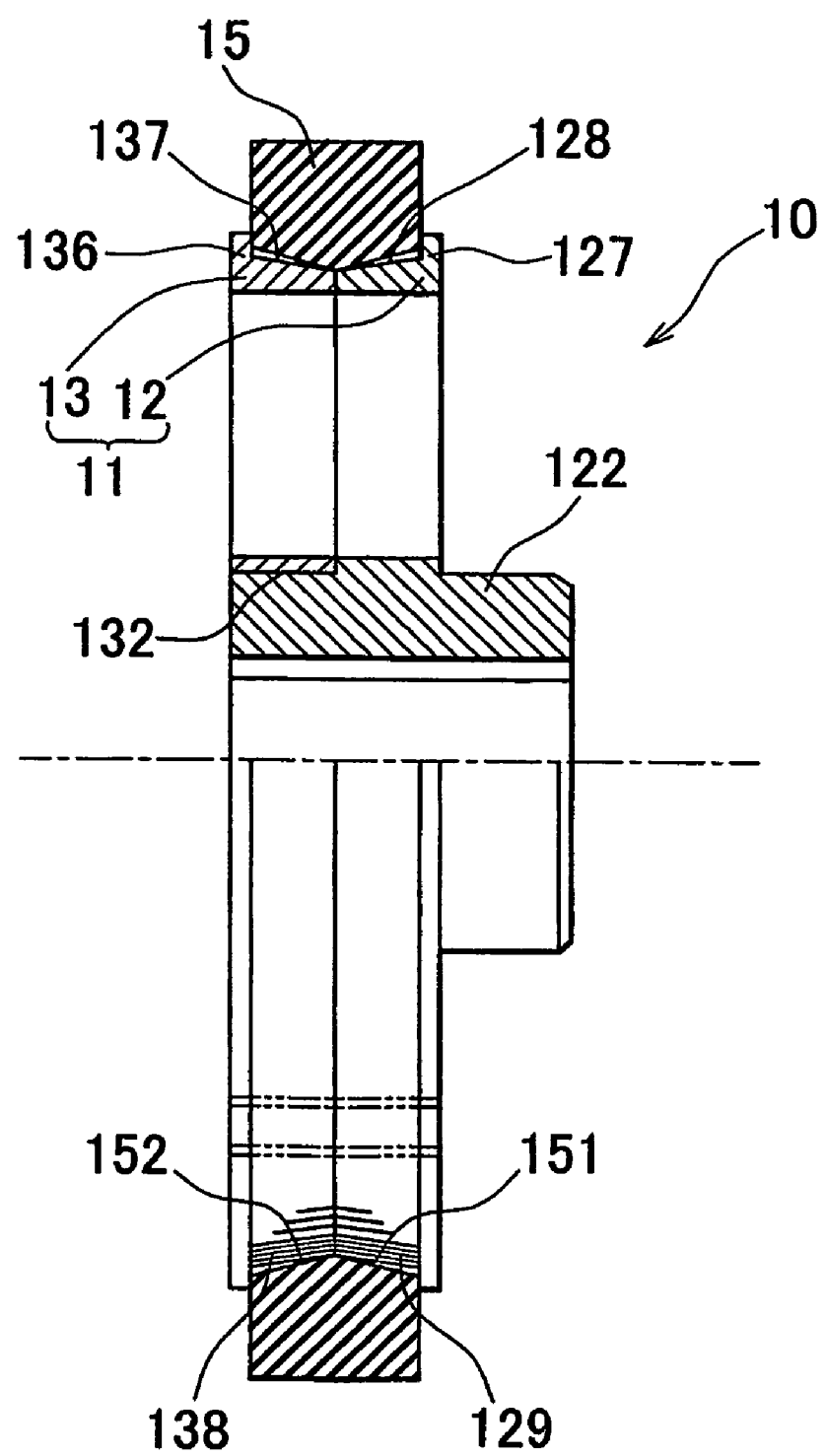
FIG. 4 is a cross sectional view showing a friction roller according to an embodiment of the invention.

As shown in FIG. 4, the friction roller 10 includes a support roller 11 made of metal, and an elastic ring 15 to which the support roller 11 is internally fitted.

The support roller 11 is formed to have a disk shape by combining a first divided roller 12 and a second divided roller 13 using bolts or the like. The first divided roller 12 and the second divided roller 13 are obtained by dividing the support roller 11 into two portions in the thickness direction. The support roller 11 can be internally fitted to the elastic ring 15.

Figure 5:
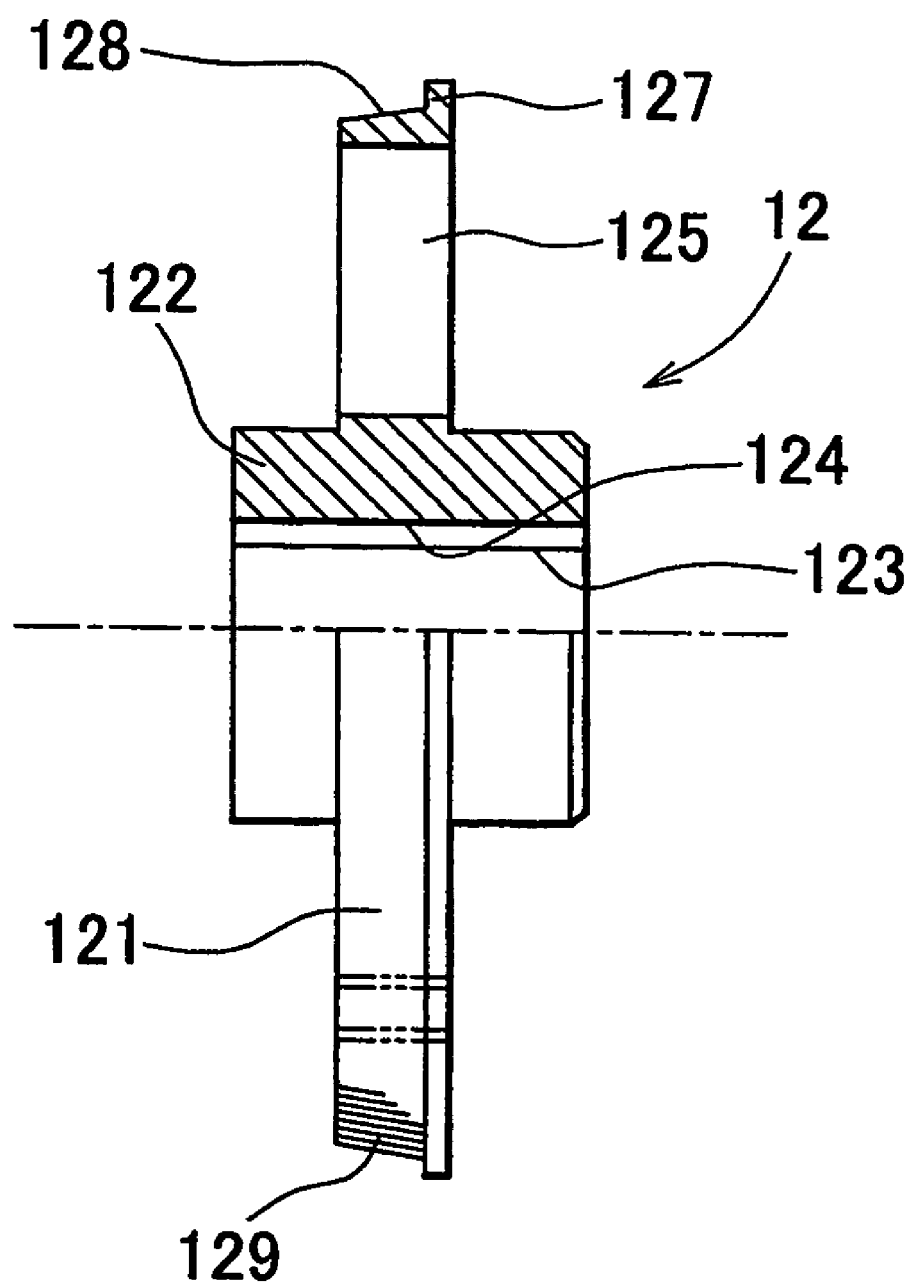
FIG. 5 is a cross sectional view showing a first divided roller shown in FIG. 4.
Figure 6:
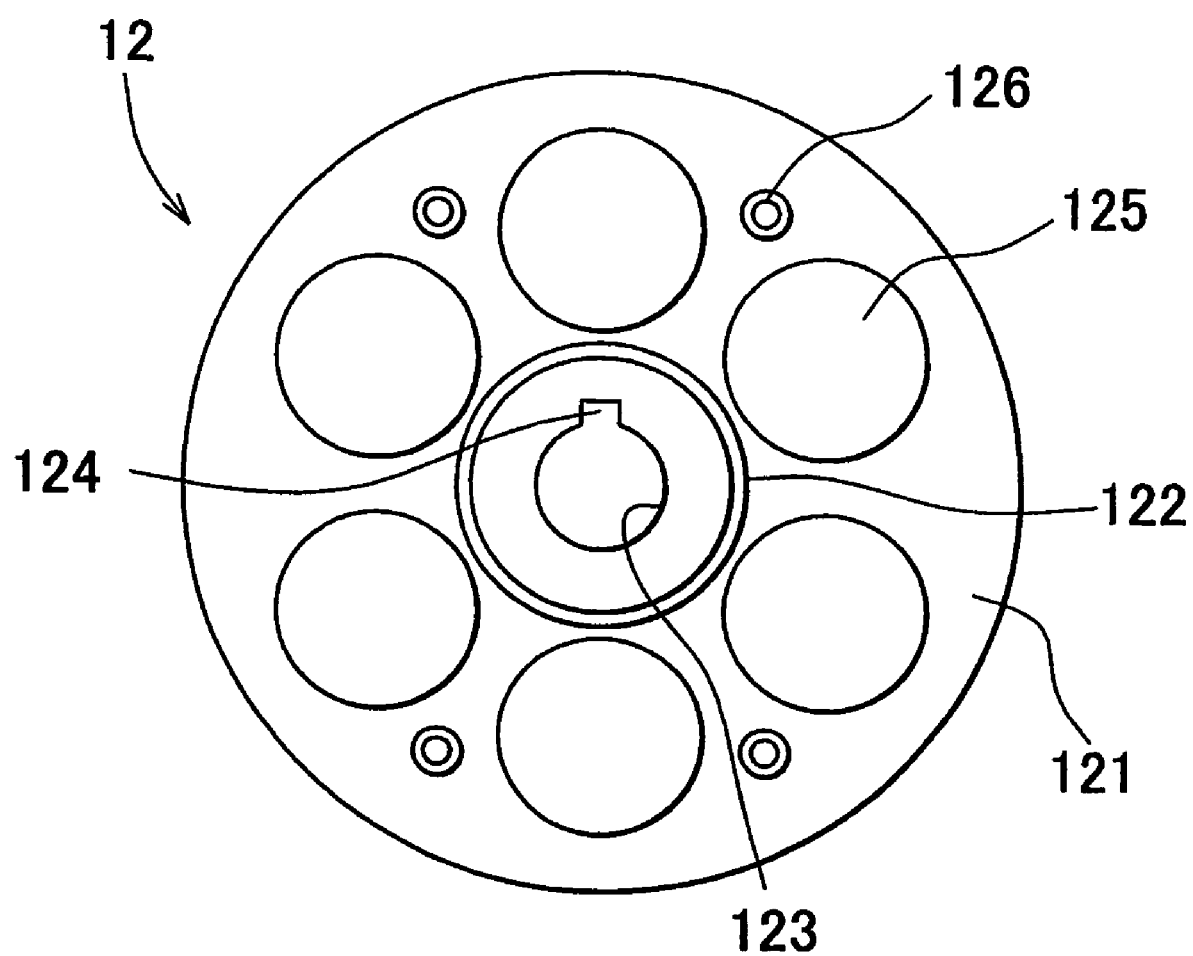
FIG. 6 is a lateral view showing the first divided roller shown in FIG. 5.

In the first divided roller 12, a boss portion 122 is formed at a center portion of a plate 121 formed to have a disk shape, and a shaft fitting hole 123 is formed inside the boss portion 122, as shown in FIG. 5 and FIG. 6. A key groove 124 is formed in the shaft fitting hole 123. The drive shaft 21 of the motor 20 is inserted into the key groove 124 such that the rotation of the drive shaft 21 is transmitted to the first divided roller 12. Further, in the plate 121, plural holes 125 (six holes in the example shown in the figure) are formed along the circumferential direction in order to reduce weight. In addition, plural female screws 126 (four screws in the example shown in the figure) are formed in the plate 121 such that the first divided roller 12 can be combined with the second divided roller 13 using bolts.

Further, a flange 127 is disposed on one side of the plate 121. The flange 127 can come into contact with the lateral face of the elastic ring 15. A taper face 128 is formed in an outer peripheral face of the plate 121. The taper face 128 tapers toward a side opposite to the flange 127. A knurling portion 129 is formed in the taper face 128. The taper face 128 has an inclination angle of approximately 10 degrees with respect to a shaft center line.

Figure 7:
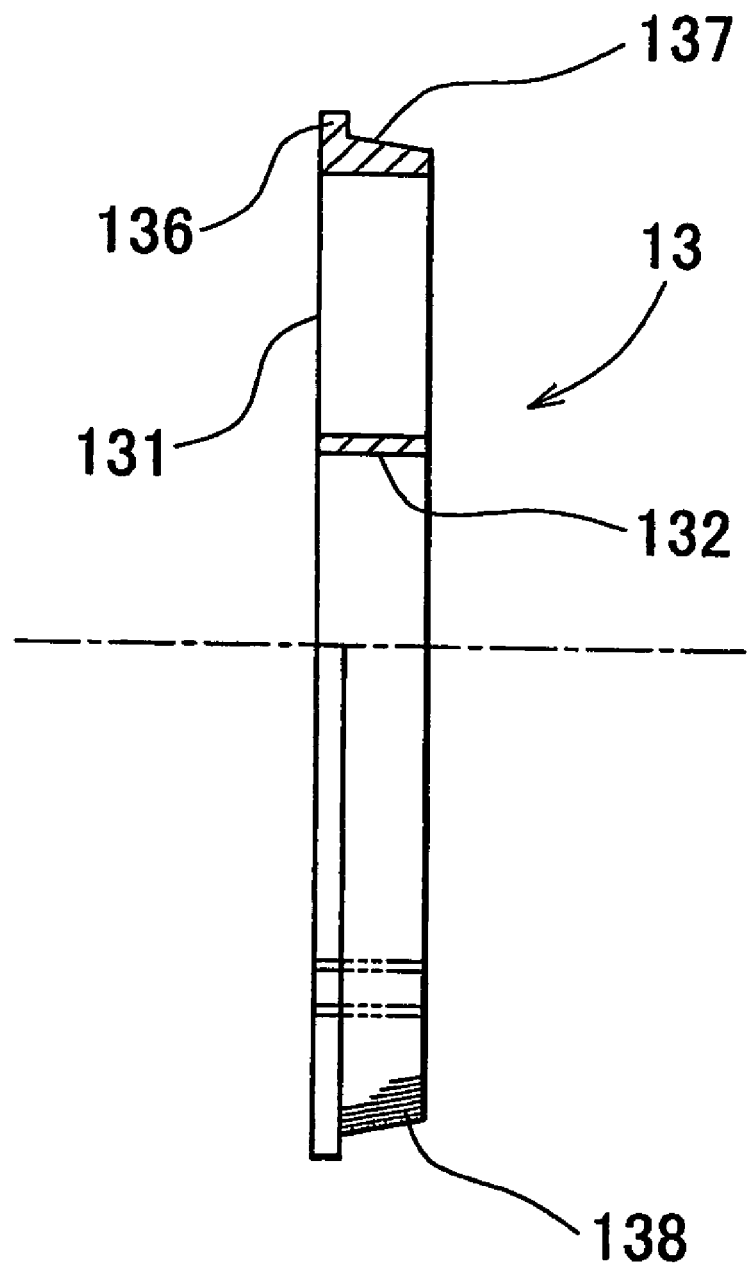
FIG. 7 is a cross sectional view showing a second divided roller shown in FIG. 4.
Figure 8:
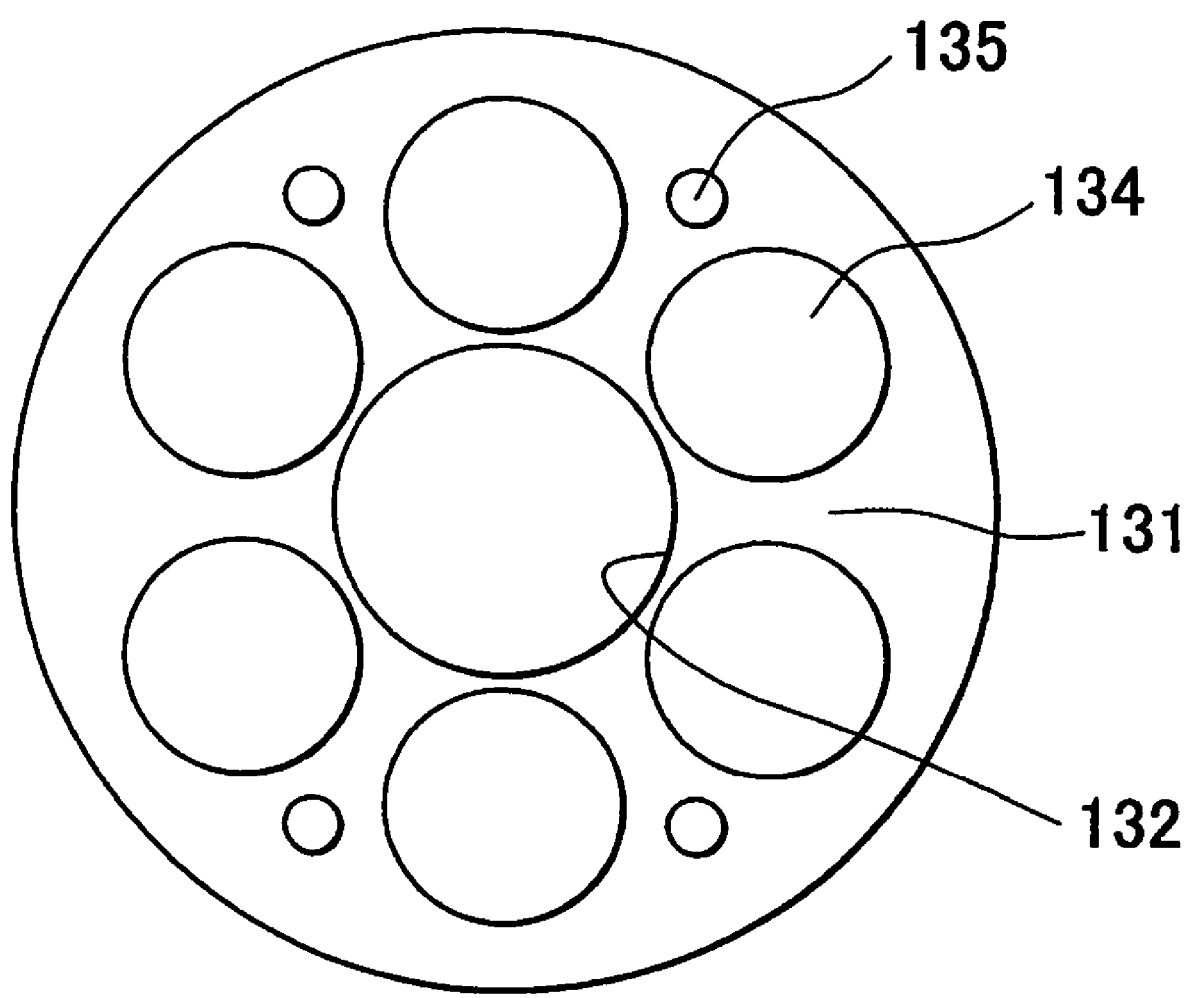
FIG. 8 is a lateral view showing the second divided roller shown in FIG. 7.
Figure 9:
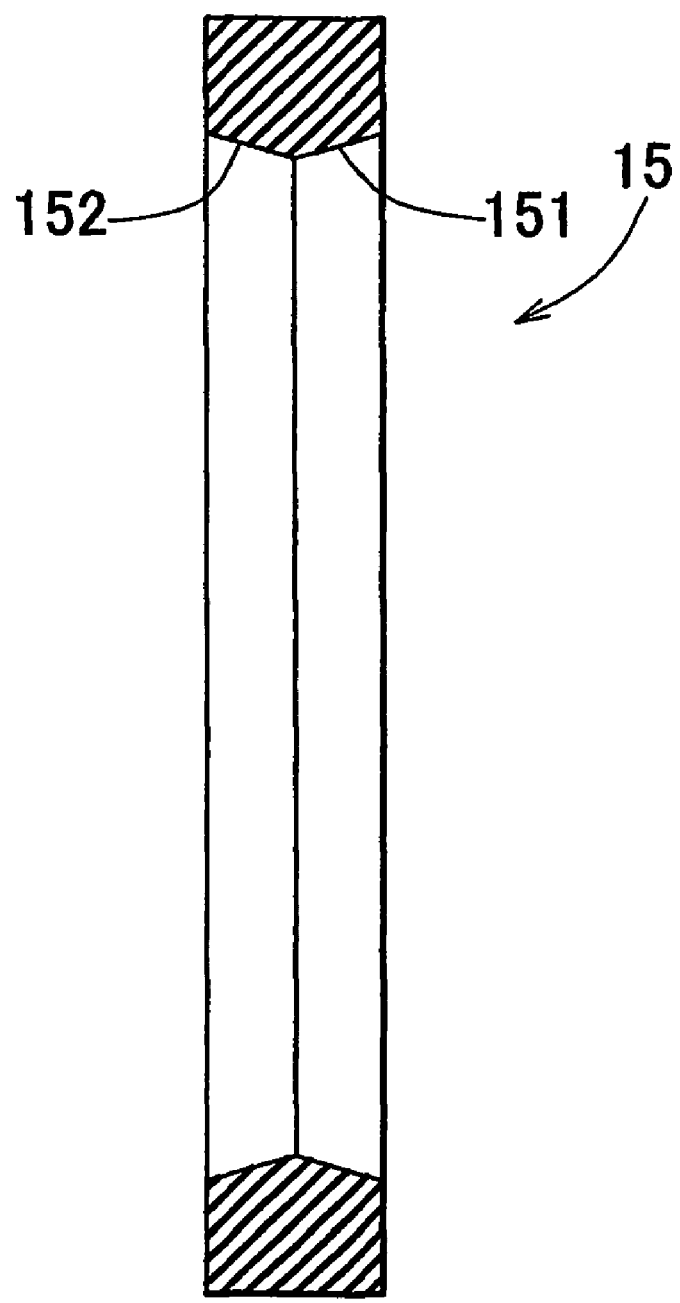
FIG. 9 is a cross sectional view showing an elastic ring shown in FIG. 4.

In the second divided roller 13, a hole portion 132 is formed at a center portion of a plate 131 having a disk shape, as shown in FIG. 7 and FIG. 8. The boss portion 122 of the first divided roller 12 is fitted into the hole portion 132. Also, in the plate 131, plural holes 134 (six holes in the example shown in the figure) are formed along the circumferential direction in order to reduce weight, as in the case of the first divided roller 12. In addition, plural bolt insertion holes 135 (four holes in the example shown in the figure) are formed in the plate 131. The bolts are screwed into the female screws 126 of the first divided roller 12.

Further, a flange 136 is disposed on one side of the plate 131. The flange 136 can come into contact with the lateral face of the elastic ring 15. A taper face 137 is formed in an outer peripheral face of the plate 131. The taper face 137 tapers toward a side opposite to the flange 136. A knurling portion 138 is formed in the taper face 137. The taper face 137 has an inclination angle of approximately 10 degrees with respect to the shaft center line.

Meanwhile, the elastic ring 15 is made of urethane rubber. In addition, taper faces 151, 152 are formed in an inner peripheral face of the elastic ring 15, as shown in FIG. 19. The taper faces 151, 152 expand outward to both lateral faces from a center position in the thickness direction. The taper face 128 formed in the outer peripheral face of the first divided roller 12 and the taper face 137 formed in the outer peripheral face of the second divided roller 13 are engaged with the taper faces 151, 152. Each of the taper faces 151, 152 formed in the inner peripheral face of the elastic ring 15 has the inclination angle of approximately 18.5 degrees with respect to the shaft center line. As a result, when the first divided roller 12 and the second divided roller 13 are inserted in the elastic ring 15, there is a gap between each of the taper faces of the divided rollers and each of the taper faces of the elastic ring 15 in the original state.

However, the elastic ring 15 is compressed in the thickness direction by fastening the second divided roller 13 to the first divided roller 12 using bolts or the like. As a result, the taper faces 151, 152 formed in the inner peripheral face of the elastic ring 15 are deformed according to the taper face 128 of the first divided roller 12 and the taper face 137 of the second divided roller 13, respectively.

Figure 10A:
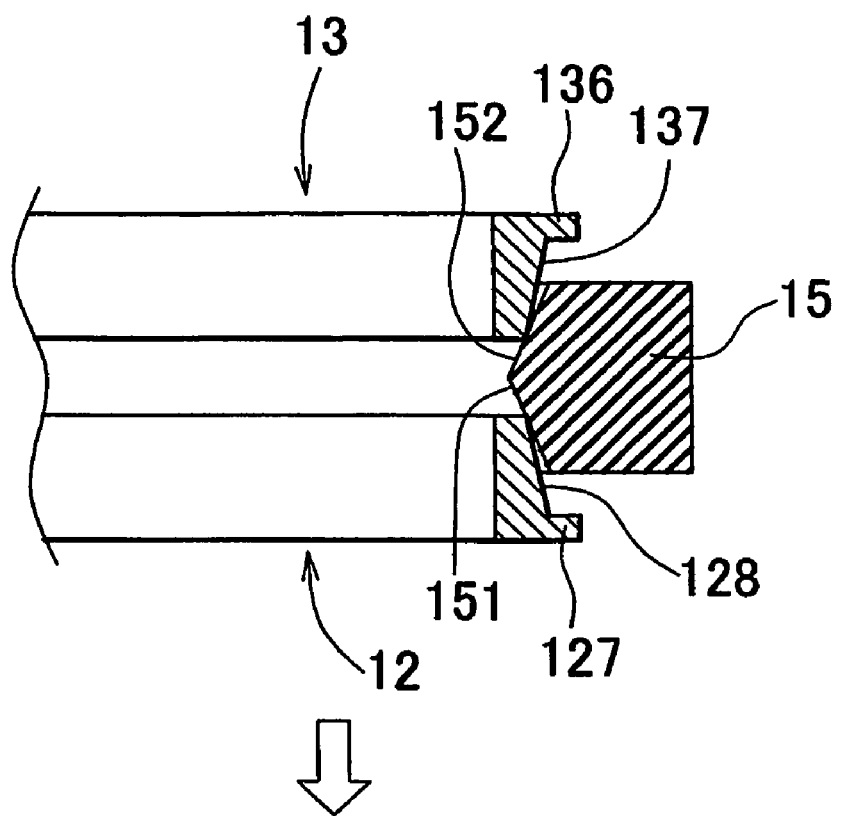
FIG. 10B is an operation view showing a procedure of fitting a support roller to the elastic ring.
Figure 10B:
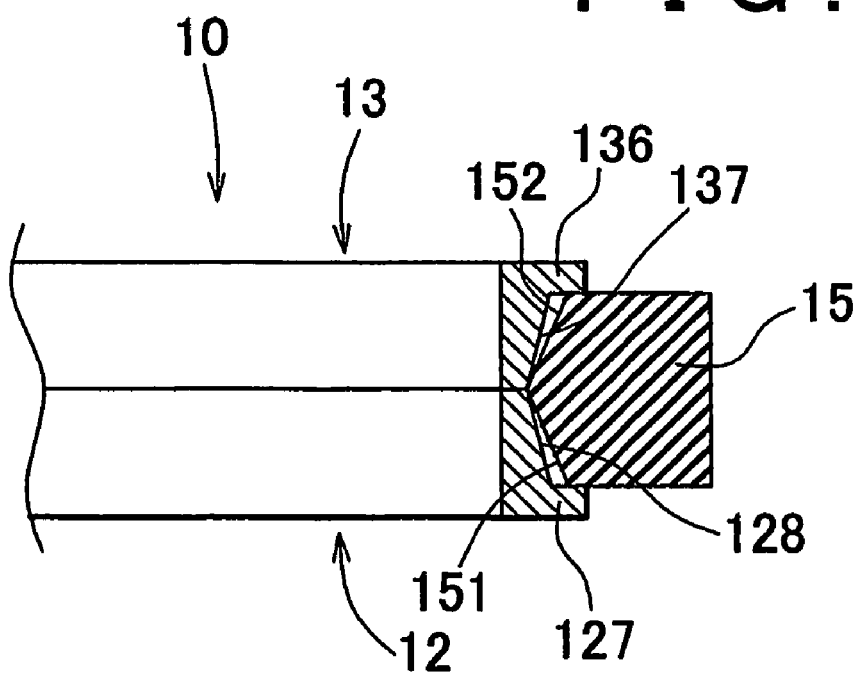

Next, a procedure of assembling the friction roller 10 thus configured will be described with reference to FIG. 10A and FIG. 10B. First, the first divided roller 12 of the support roller 11 is inserted in the elastic ring 15. At this time, the insertion is performed such that the taper face 128 of the first divided roller 12 is engaged with the taper face 151 formed in the inner peripheral face of the elastic ring 15 with the flange 127 of the first divided roller 12 being disposed outside the lateral face of the elastic ring 15.

Next, the second divided roller 13 is inserted, from the side opposite to the first divided roller 12, in a hollow portion of the elastic ring 15 in which the first divided roller 12 has been inserted. The insertion is performed such that the taper face 137 of the second divided roller 13 is engaged with the other taper face 152 formed in the inner peripheral face of the elastic ring 15 with the flange 136 of the second divided roller 13 being disposed outside the elastic ring 15. Thus, as shown in FIG. 4, the boss portion 122 of the first divided roller 12 is fitted in the hole portion 132 of the second divided roller 13. At this time, the second divided roller 13 is positioned while the angle thereof is adjusted such that the four bolt insertion holes 135 of the second divided roller 13 (refer to FIG. 8) are opposed to the positions of the four female screws 126 of the first divided roller 12 (refer to FIG. 6).

Each of the taper face 128 of the first divided roller 12 of the support roller 11 and the taper face 137 of the second divided roller 13 has the inclination angle smaller than that of each of the taper faces 151, 152 of the elastic ring 15. Therefore, in a state where the support roller 11 has been inserted in the elastic ring 15, each of the first divided roller 12 and the second divided roller 13 is in a point contact with each of the taper faces 151, 152 of the elastic ring 15 at an end face on the side opposite to the flange before both the divided rollers are combined using the bolts, as shown in FIG. 10A. Accordingly, the insertion can be easily performed. Further, there is a gap between the first divided roller 12 and the second divided roller 13.

In this state, the four bolts are inserted from the bolt insertion holes 135 of the second divided roller 13, screwed into the female screws 126, and tightened.

When the four bolts are tightened, the first divided roller 12 and the second divided roller 13 come closer to each other and the faces opposed to each other are come into contact with each other. At this time, as shown in FIG. 10B, the elastic ring 15 is pressed by the flange 127 of the first divided roller 12 and the flange 136 of the divided roller 13, and is deformed so as to be compressed in the thickness direction.

When the elastic ring 15 is compressed in the thickness direction, the taper faces 151, 152 thereof are deformed so as to come into contact with the taper face 128 of the first divided roller 12 and the taper face 137 of the second divided roller 13. Thus, the contact area therebetween increases.

In a state where the bolts have been completely tightened, the taper face 128 of the first divided roller 12 and the taper face 137 of the second divided roller 13 are positioned by the taper faces 151, 152 of the elastic ring 15, respectively. Thus, the friction roller 10 is assembled with a small gap left between each of the taper faces 151, 152 of the elastic ring 15 and each of the taper face 128 of the first divided roller 12 and the taper face 137 of the second divided roller 13.

In the friction roller 10 in which the support roller 11 is fitted to the elastic ring 15, since the knurling portion 129 is formed in the taper face 128 of the first divided roller 12, and the knurling portion 138 is formed in the taper face 137 of the second divided roller 13, slipping is prevented when the taper faces 128, 137 of the divided rollers come into contact with the taper faces 151, 152 of the elastic ring 15. Accordingly, sliding does not occur between each of the divided rollers 12, 13 of the support roller 11 and the elastic ring 15, and thus the efficiency of transmitting the rotation can be improved.

Also, when the assembled friction roller 10 is disassembled, the four bolts are released, and the second divided roller 13 is removed so as to be separated from the divided roller 12. At this time, the first divided roller 12 and the second divided roller 13 can be fitted to, and separated from the elastic ring 15 easily, since there is a small gap between each of the taper faces 128, 137 of the divided rollers 12, 13 and each of the taper faces 151, 152 of the elastic ring 15.

Next, there will be described an operation of fitting the friction roller 10 thus assembled in the conveyor 1 shown in FIG. 1 to FIG. 3 for conveying the jig pallet 2.

The friction roller 10 is fitted to the frame (not shown) in the conveyor 1 such that the friction roller 10 can rotate with respect to the drive shaft 21. The guide roller 7 is fitted to a portion opposite to the friction roller 10 with the rail 3 being therebetween such that the guide roller 7 can rotate. Thus, the rail 3 is sandwiched between the friction roller 10 and the guide roller 7. The pair of the horizontal members 5 is fixed on the rail 3 in parallel, and the automobile body is placed on the horizontal members 5.

When the motor 20 rotates the drive shaft 21 in one direction, the friction roller 10 is rotated in a counterclockwise direction in FIG. 2. Since the friction roller 10 is disposed so as to be pressed against the lateral face of the rail 3, the rail 3 can actively move forward in the proceeding direction due to the frictional force of the friction roller 10 when the friction roller 10 and the guide roller 7 are rotated. The friction roller 10 is rotated until the jig pallet 2 reaches the welding process which is a next process. When the jig pallet 2 is conveyed to the welding process, the rotation is stopped.

Then, welding is performed on each portion of the automobile body B on the jig pallet 2 that has been conveyed to the next welding process, and then a next jig pallet 2 is placed on the conveyor 1. Since this conveyance operation is repeatedly performed, the elastic ring 15 of the friction roller 10 wears out, and the elastic ring 15 is replaced with a new elastic ring 15. The replacement is performed according to the procedure described above.

Figure 11:
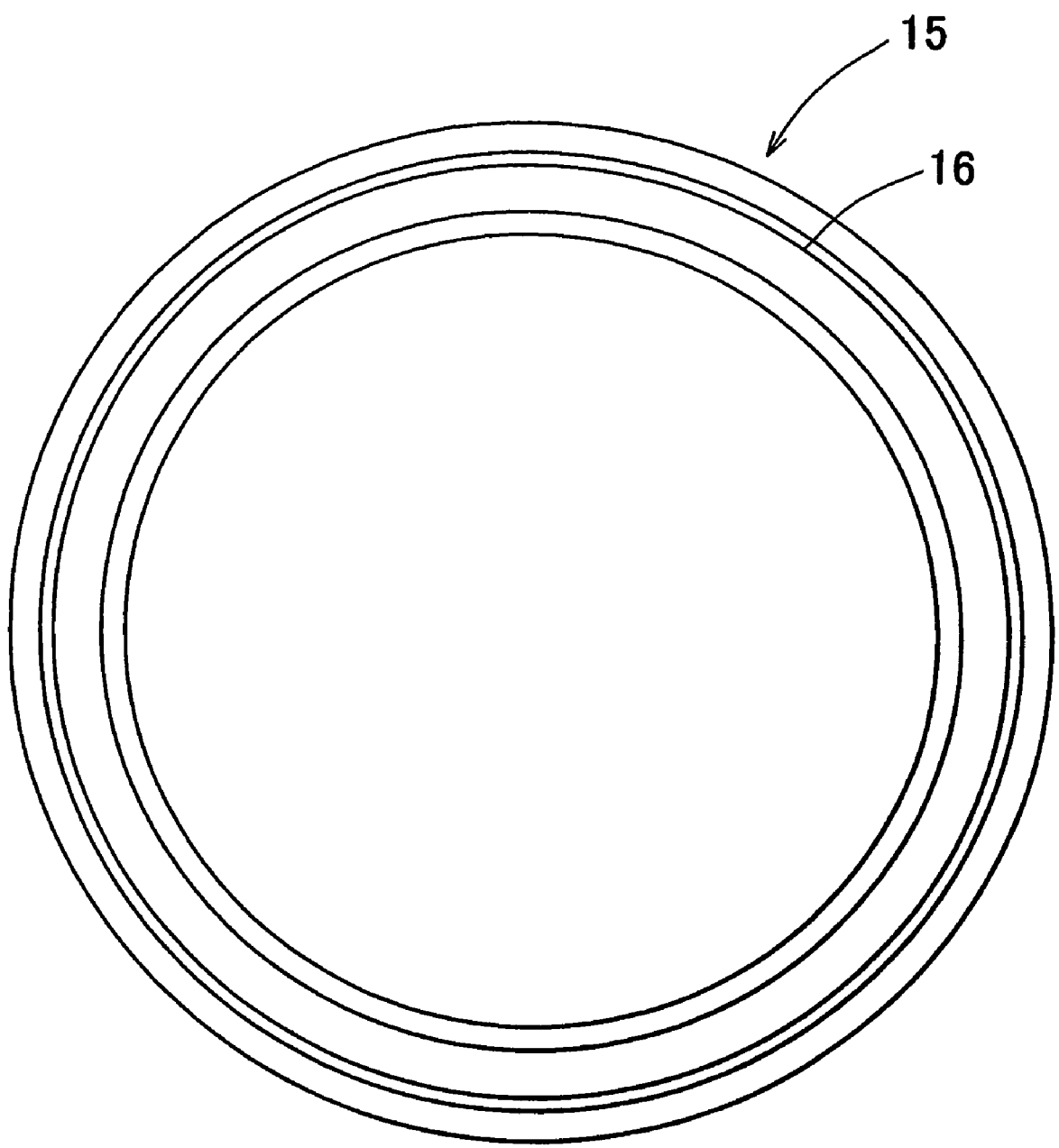
FIG. 11 is a plan view showing an elastic ring in which a line for a slip sign is formed.
Figure 12A:
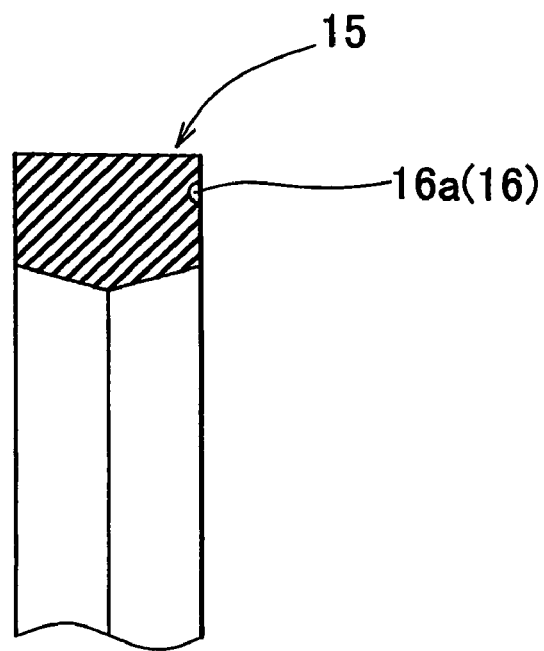
FIG. 12B is a cross sectional view showing the elastic ring shown in FIG. 11 and a modified example thereof.
Figure 12B:
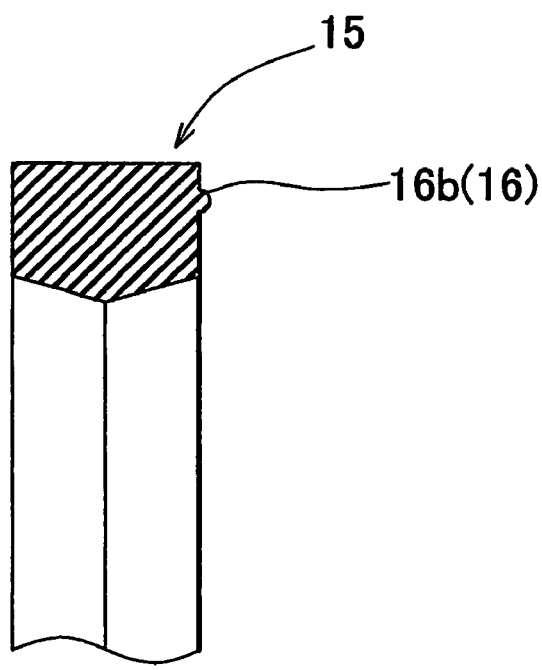
Figure 13:
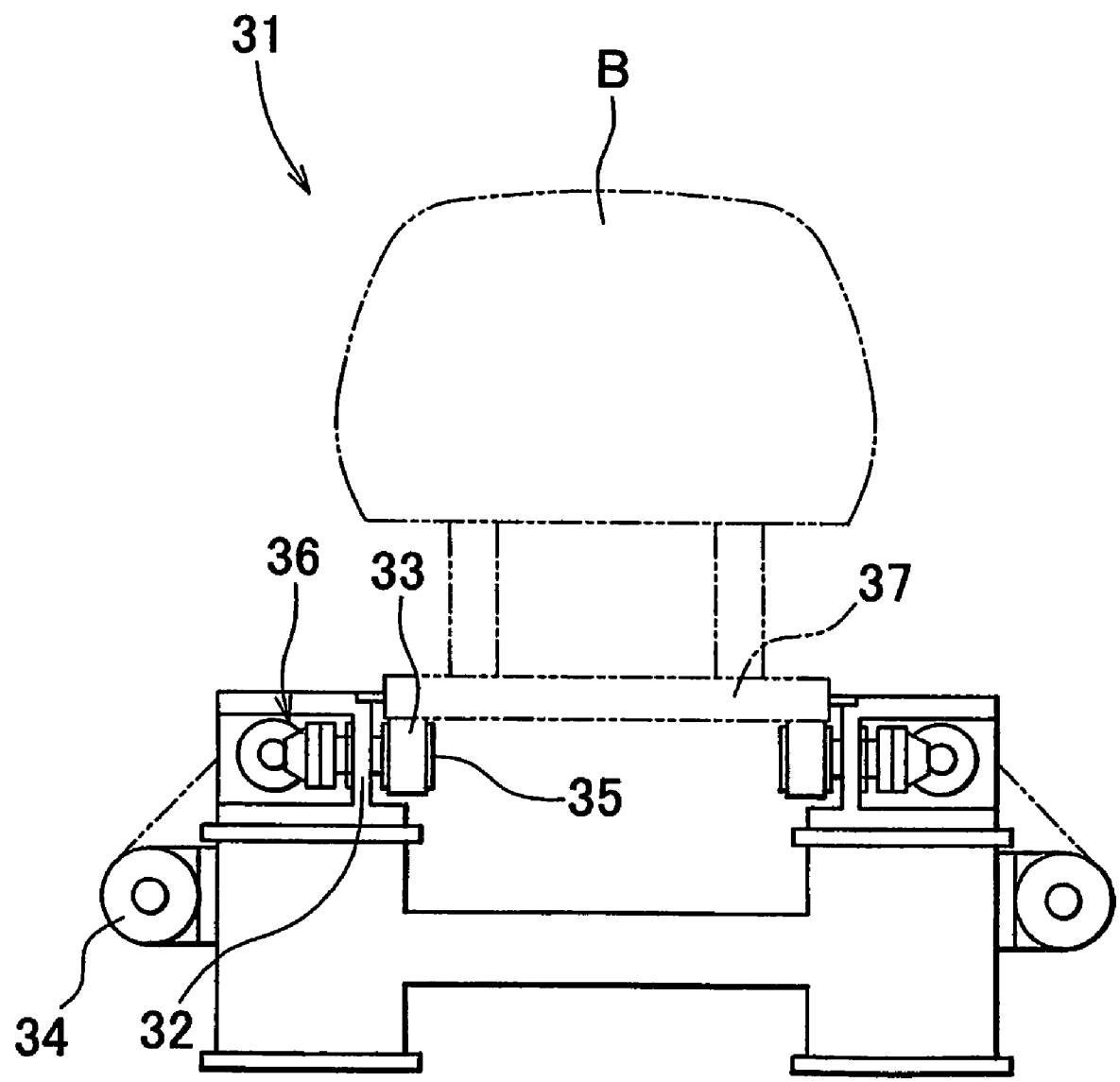
FIG. 13 is a front view showing a conventional commonly used conveyor which conveys an automobile body.
Figure 14:
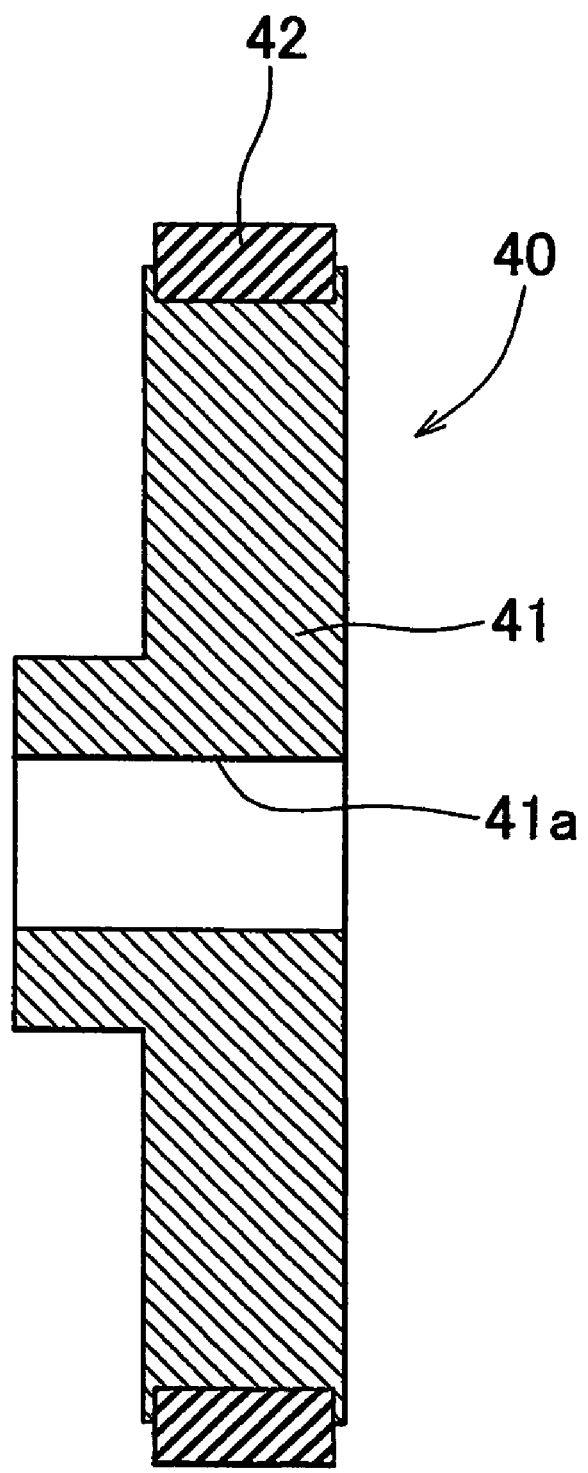
FIG. 14 is a cross sectional view showing a conventional friction roller.

In the case of the elastic ring 15 according to the embodiment of the invention, when the outer peripheral face of the friction roller 10 has worn out after used for a long time, the slip sign formed in one lateral face of the elastic ring 15 can be used as a reference for determining the time at which the elastic ring 15 needs to be replaced with a new one. That is, as shown in FIG. 11 and FIG. 12, a line 16 composed of a concave groove 16a (refer to FIG. 12A), a protrusion ring 16b (refer to FIG. 12B), or the like is formed continuously or intermittently at a predetermined position along the circumferential direction in the entire circumference of the lateral face of the elastic roller 15 which becomes an upper lateral face when fitted to the conveyor 1 so as to be integrated with the elastic ring 15. With this arrangement, the fact that the elastic ring 15 has worn out to the position of the concave groove 16a or the protrusion ring 16b indicates, as the slip sign, a reference for determining the time at which the elastic roller needs to be replaced with a new one.

As described above, in the friction roller 10 in a conveyor according to the embodiment of the invention, the following effects can be obtained. The support roller 11 which is internally fitted to the elastic ring 15 is formed so as to be divided into two portions in the thickness direction, that is, the first divided roller 12 and the second divided roller 13, whereby the elastic ring 15 and the support roller 11 can be combined with each other and can be separated from each other. With this arrangement, in the case where the elastic ring 15 has worn out after the jig pallet 2 is repeatedly conveyed, only the elastic ring 15 can be replaced with a new one, and the support roller 11 does not need to be discarded. Therefore, the friction roller 10 can be replaced with a new one reusing the support ring 11, which suppresses an increase in cost.

Further, the taper faces 151, 152, which expand outward to both lateral faces from the center portion in the thickness direction, are formed in the inner peripheral face of the elastic ring 15. Also, the taper face 128, 137 are formed in the outer peripheral faces of the first divided roller 12 and the second divided roller 13 of the support roller 11 such that each of the taper faces 128, 137 has the inclination angle smaller than that of each of the taper faces 151, 152 of the elastic ring 15. With this arrangement, when the two divided rollers 12, 13 are fitted to, and separated from the elastic ring 15, the divided rollers 12, 13 can be inserted and removed easily, that is, the friction roller 10 can be disassembled and assembled easily.

Further, since the knurling portion 129 is formed in the taper face 128 formed in the outer peripheral face of the first divided roller 12, and the knurling portion 138 is formed in the taper face 137 formed in the outer peripheral face of the second divided roller 13, slipping is prevented after the first divided roller 12 and the second divided roller 13 are internally fitted to the elastic ring 15. Accordingly, sliding does not occur between each of the divided rollers 12, 13 of the support roller 11 and the elastic ring 15, and thus the efficiency of transmitting the rotation can be improved.

Further, since the concave groove 16a or the protrusion ring 16b is formed in the entire circumference of one lateral face of the elastic ring 15, a reference for determining the time at which the elastic ring 15 needs to be replaced with a new one can be indicated by the concave groove 16a or the protrusion ring 16b, as the slip sign.

The invention is not limited to the friction roller having the aforementioned configuration. For example, the taper faces formed in the outer peripheral faces of the first divided roller and the second divided roller, and the taper faces formed in the inner peripheral face of the elastic ring may all have the same inclination angle.

A convex portion may formed in the entire circumference of the inner peripheral face of the elastic ring at a central portion in the thickness direction, and may be used as a stopper when the first divided roller and the second divided roller are inserted. In this case, the inner peripheral face of the elastic ring and the outer peripheral faces of the first divided roller and the second divided roller may be straight faces (that is, faces which are in parallel with the rotation shaft of the friction roller), instead of taper faces.

The invention is not limited to the assembly line in which an automobile body is conveyed by a conveyor. The invention can be applied to an assembly line in which equipment or electric machinery is conveyed by a conveyor.

The invention claimed is:

1. A friction roller, which is fitted to a conveyor in an assembly line, and which conveys a jig pallet. comprising:
   an annular elastic ring which can come into contact with the jig pallet; and a support roller which is internally fitted to the elastic ring, and which is connected to a drive source, wherein the elastic ring includes positioning means for positioning the support roller; the support roller is formed so as to be divided into two divided portions in a thickness direction; and each of the two divided portions is internally fitted to the elastic ring, and then the two divided portions are combined such that the elastic ring and the support roller are integrated;

wherein the positioning means of the elastic ring includes symmetrical taper faces which expand outward to both lateral faces, and which are formed in an inner peripheral face of the elastic ring.

wherein an outer peripheral face of each of the divided portions of the support roller is formed to have a taper face so that the outer peripheral face can be positioned with respect to the elastic ring, and a taper angle of the taper face of each of the divided portions is smaller than that of each of the taper faces formed in the inner peripheral face of the elastic ring.

2. The friction roller according to claim 1, wherein a knurling portion is formed in the taper face of each of the divided portions of the support roller.

3. A friction roller, which is fitted to a conveyor in an assembly line, and which conveys a jig pallet, comprising:
an annular elastic ring which can come into contact with the jig pallet; and
a support roller which is internally fitted to the elastic ring, and which is connected to a drive source, wherein the elastic ring includes positioning means for positioning the support roller; the support roller is formed so as to be divided into two divided portions in a thickness direction; and each of the two divided portions is internally fitted to the elastic ring, and then the two divided portions are combined such that the elastic ring and the support roller are integrated;
wherein a concave groove or a protrusion ring is formed continuously or intermittently in an entire circumference of one lateral face of the elastic ring.

* * * * *